United States Patent
Smay et al.

(10) Patent No.: US 7,360,771 B2
(45) Date of Patent: Apr. 22, 2008

(54) ROLL CONTROL ACTUATOR WITH ROTARY MECHANISM

(75) Inventors: Eric A. Smay, Warren, MI (US); Simon Dean, West Bloomfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 282 days.

(21) Appl. No.: 11/242,983

(22) Filed: Oct. 4, 2005

(65) Prior Publication Data

US 2007/0075515 A1 Apr. 5, 2007

(51) Int. Cl.
*B60G 17/005* (2006.01)

(52) U.S. Cl. .................................. 280/5.511

(58) Field of Classification Search ............. 280/5.506, 280/5.507, 5.508, 5.509, 5.511, 124.106, 280/124.107; 188/293, 296
See application file for complete search history.

(56) References Cited

U.S. PATENT DOCUMENTS

| | | | | |
|---|---|---|---|---|
| 3,197,233 A | * | 7/1965 | Bauer et al. | 280/5.502 |
| 4,919,444 A | * | 4/1990 | Leiber et al. | 280/5.511 |
| 5,020,826 A | * | 6/1991 | Stecklein et al. | 280/124.159 |
| 5,632,502 A | * | 5/1997 | Oppitz et al. | 280/124.106 |
| 5,791,444 A | | 8/1998 | Schiffler | |
| 6,520,510 B1 | * | 2/2003 | Germain et al. | 280/5.511 |
| 6,951,341 B1 | * | 10/2005 | Beetz et al. | 280/5.511 |
| 2004/0217569 A1 | * | 11/2004 | Gradu et al. | 280/124.107 |

* cited by examiner

*Primary Examiner*—Eric Culbreth
*Assistant Examiner*—Joseph Rocca
(74) *Attorney, Agent, or Firm*—Carlson, Gaskey & Olds

(57) ABSTRACT

A roll control actuator for a stabilizer bar includes an outer housing that is fixed to a first bar portion and a paddle member that is fixed to a second bar portion. The roll control actuator includes multiple fluid chambers with different fluid volumes. A control is used to selectively adjust roll stiffness of the stabilizer bar and includes a control valve in fluid communication with an accumulator. The first and second stabilizer bars can rotate relative to each other when the control valve is open to decrease roll stiffness and provide good ride quality. When the control valve is open, fluid flows freely between the fluid chambers. The first and second bar portions are hydraulically locked together when the control valve is closed to increase roll stiffness during cornering maneuvers. When the control valve is closed, the accumulator is isolated from the roll control actuator and fluid flow through the fluid chambers cannot occur due to differing fluid volumes.

17 Claims, 3 Drawing Sheets

ROLL CONTROL ACTUATOR WITH ROTARY MECHANISM

TECHNICAL FIELD

The subject invention relates to a roll control actuator for a stabilizer bar in a vehicle suspension that actively controls roll characteristics to provide desired roll stiffness during turning without adversely affecting ride quality.

BACKGROUND OF THE INVENTION

Vehicle suspension systems are used to absorb road load inputs and other vibrations to provide a smooth and comfortable ride. Vehicle suspension systems often include a stabilizer bar that is used to increase roll rigidity and improve steering stability. Typically, the stabilizer bar is connected to lower control arms, which are mounted to a wheel component, such as a knuckle. In this typical configuration, the stabilizer bar controls sway and provides a pull down force during turning maneuvers.

During a turn, a vehicle body has a tendency to roll to the outside of the turn. Suspension components on the outside of the turn are compressed while the suspension components on the inside of the turn are extended. The stabilizer bar helps to counter this motion by providing opposing input at each location. Thus, the stabilizer bar pushes up on collapsed components and compresses extended components during turning.

In order to provide a good ride quality it is desirable to control a stiffness/compliance of the stabilizer bar. During turning maneuvers, it is desirable to increase the stiffness of the stabilizer bar to reduce the occurrence of vehicle rollover. However, if the stabilizer bar is too stiff, ride quality and handling characteristics can be compromised. Thus, it is desirable to have a stabilizer bar with variable stiffness to adjust for different driving conditions.

Different mechanisms for varying stiffness in a stabilizer bar have been proposed, including using variable clamping devices and solenoid controlled pin stops, for example. These mechanisms are often complex and expensive. Thus, there is a need for a simplified active control for adjusting stiffness in a stabilizer bar.

SUMMARY OF THE INVENTION

A roll control actuator for a stabilizer bar in a vehicle suspension is used to connect first and second bar portions to each other. The roll control actuator includes an outer housing that is fixed to the first bar portion and an internal mechanism that is fixed to the second bar portion. The internal mechanism cooperates with the outer housing to define a plurality of fluid chambers that have different fluid volumes. A control is used to selectively adjust roll stiffness of the stabilizer bar to respond to different driving conditions.

The control includes a control valve in fluid communication with an accumulator. The first and second bar portions can rotate relative to each other when the control valve is open to decrease roll stiffness and provide good ride quality. When the control valve is open, fluid flows freely between the fluid chambers. The first and second bar portions are hydraulically locked together when the control valve is closed to increase roll stiffness during cornering maneuvers. When the control valve is closed, the accumulator is isolated from the roll control actuator and fluid flow through the fluid chambers cannot occur due to the differing fluid volumes.

The internal mechanism comprises a paddle member received within the outer housing, and which has at least one paddle flange that extends radially outwardly toward the outer housing. The paddle member can include additional paddle flanges and/or the outer housing can include housing flanges that extend radially inwardly toward the paddle member. The paddle and/or housing flanges cooperate with each other to define the plurality of fluid chambers.

In one disclosed configuration, the paddle member includes first and second paddle flanges and the outer housing includes first and second housing flanges. The paddle flanges are alternated with the housing flanges to form first, second, third, and fourth fluid chambers. The first and second fluid chambers have different fluid volumes than the third and fourth fluid chambers. First and second ports fluidly connect the first and second fluid chambers to the control valve and accumulator. A third port fluidly connects the first fluid chamber to the third fluid chamber, and a fourth port connects the second fluid chamber to the fourth fluid chamber.

Fluid flows freely through all ports when the control valve is open, which results in reduced roll stiffness. When the control valve is closed, isolating the accumulator, fluid is prevented from flowing through the ports due to differences in volume between the first and second fluid chambers and the third and fourth fluid chambers. This locks the first and second bar portions together, which results in increased roll stiffness. The control selectively closes the control valve to increase roll stiffness during cornering maneuvers, and opens the control valve after cornering maneuvers to decrease roll stiffness and improve ride quality.

Accordingly, the subject invention provides a stabilizer bar with an active control that provides desired roll characteristics during cornering without adversely affecting vehicle ride. These and other features of the present invention can be best understood from the following specification and drawings, the following of which is a brief description.

DETAILED DESCRIPTION OF THE PREFERRED EMBODIMENT

Figure 1:
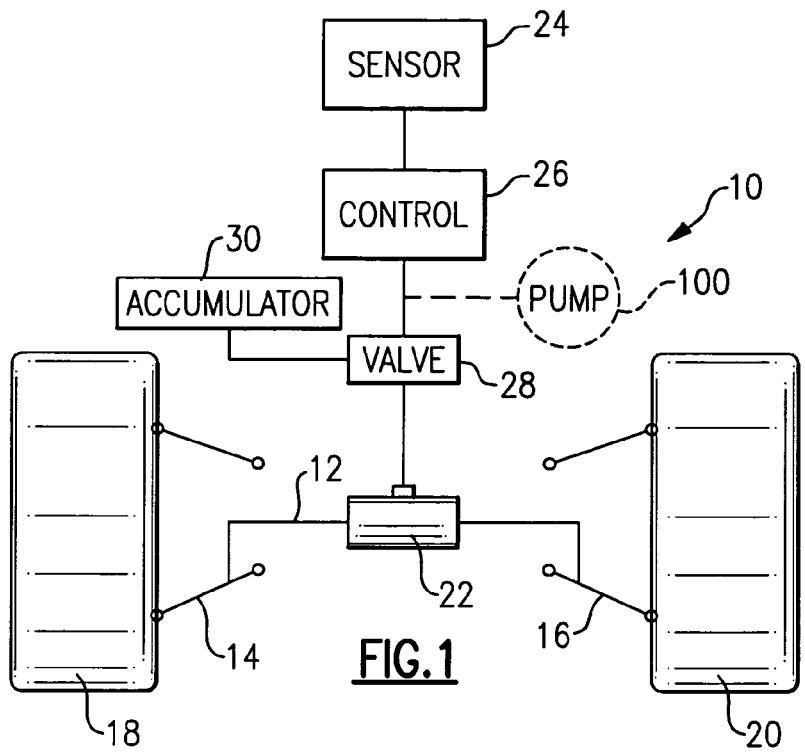
FIG. 1 is a schematic view of a vehicle suspension system with a stabilizer bar incorporating the subject invention.

A vehicle suspension system 10 is shown schematically in FIG. 1. The vehicle suspension system 10 includes a stabilizer bar 12 that has one end mounted to a first suspension component 14 and an opposite end mounted to a second suspension component 16. In one example, the first 14 and second 16 suspension components are lower control arms, however, it should be understood that the ends of the stabilizer bar 12 could also be supported by or mounted to other suspension components.

The first 14 and second 16 suspension components are coupled to first 18 and second 20 wheels, respectively. The vehicle suspension system 10 absorbs road load inputs and other vibrations to provide a smooth and comfortable ride. The stabilizer bar 12 is used to increase roll rigidity and improve steering stability. The stabilizer bar 12 includes a roll control actuator 22 that actively adjusts roll stiffness of the stabilizer bar 12 to provide desired roll characteristics for different driving conditions. The roll control actuator 22 can be used with any type of stabilizer bar 12, and the stabilizer bar 12 can be used in any type of suspension.

During vehicle operation, a sensor 24 monitors at least one ride parameter, such as lateral acceleration or yaw rate, for example. The sensor 24 communicates with a control 26 that detects when the ride parameter exceeds a threshold value. The control 26 then actuates the roll control actuator 22 to adjust stabilizer bar stiffness as needed.

Figure 2:
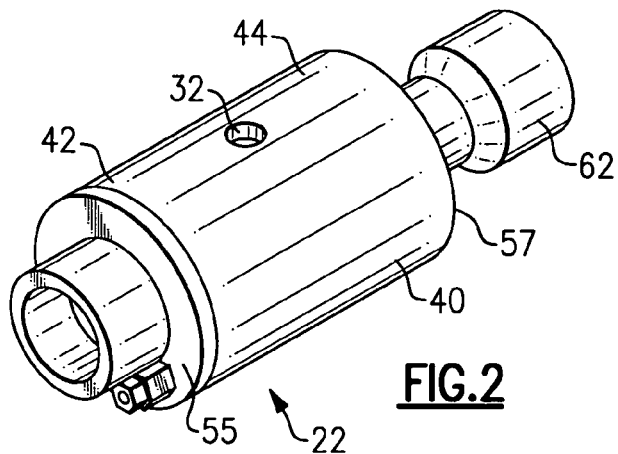
FIG. 2 is a perspective view of a roll control actuator incorporating the subject invention.

The control 26 includes a control valve 28 and an accumulator 30 that controls fluid flow to the roll control actuator 22 to adjust roll stiffness. As shown in FIG. 2, the roll control actuator 22 includes an inlet port 32 that is in fluid communication with control valve 28. When the control valve 28 is open fluid flows freely within the roll control actuator 22 and roll stiffness is thereby reduced to provide good ride quality. When the control valve 28 is closed, roll stiffness is increased by hydraulically locking the roll control actuator 22 to prevent fluid flow. This will be discussed in greater detail below.

Figure 3:
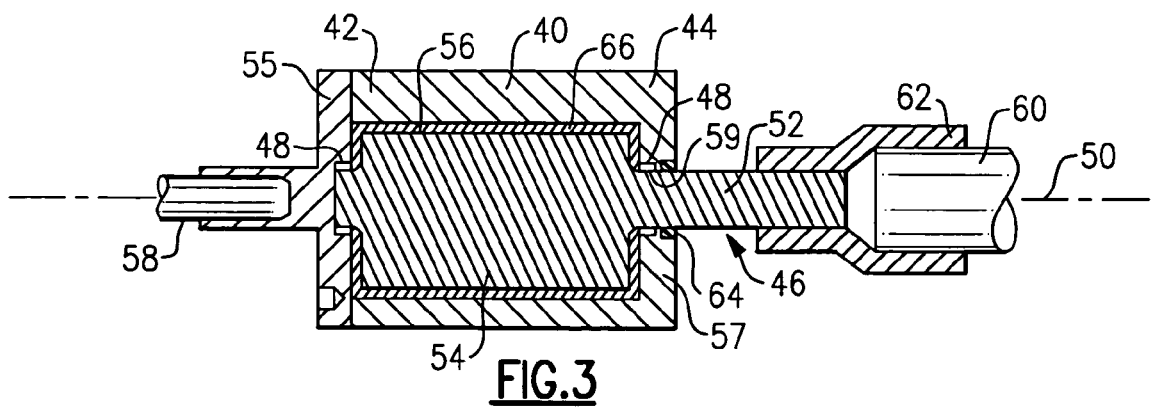
FIG. 3 is a cross-sectional view of one example of a roll control actuator incorporating the subject invention.
Figure 4:
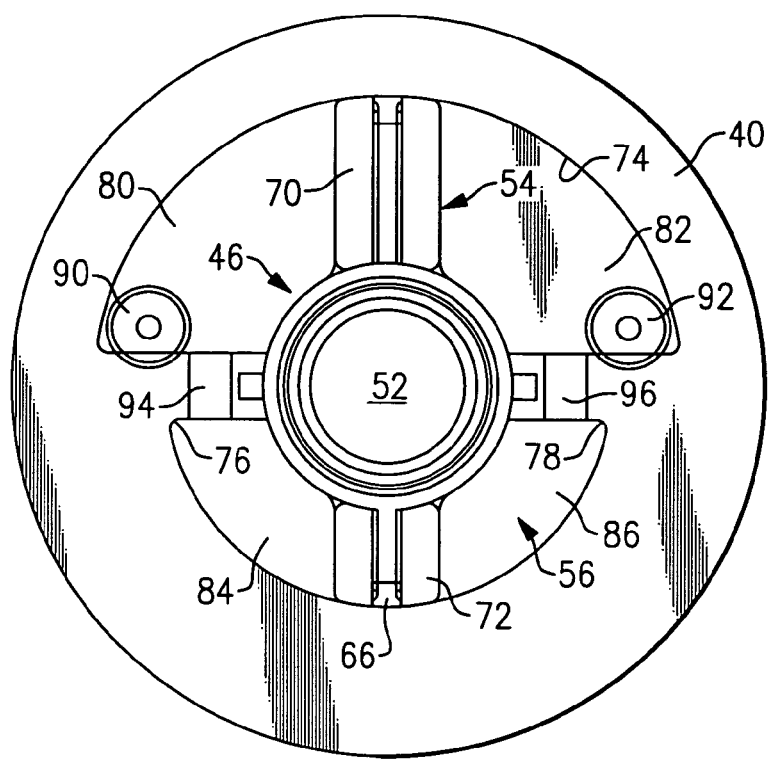
FIG. 4 is an end view of the roll control actuator.

One example of a roll control actuator 22 is shown in FIG. 3-4. The roll control actuator 22 includes an outer housing 40 with having first 42 and second 44 ends. An internal mechanism, shown generally at 46, is supported by bearing assemblies 48 for rotation about an axis 50. The internal mechanism 46 comprises a shaft portion 52 and a paddle portion 54.

An end cap 55 is mounted to the first end 42 of the outer housing 40. The second end 44 of the outer housing 40 is includes a flange portion 57 that extends inwardly toward the axis 50. The flange portion 57 includes an opening 59 that receives the shaft portion 52. The outer housing 40, end cap 55, and flange portion 57 cooperate to define an interior chamber 56. The paddle portion 54 is received within the interior chamber 56.

The stabilizer bar 12 includes a first bar portion 58 that is fixed to the end cap 55 and a second bar portion 60 that is fixed to the shaft portion 52 of the internal mechanism 46 with a coupler 62. One end of the shaft portion 52 extends through the opening 59 in the flange portion 57 and is supported by the bearing assembly 48. An opposite end of the shaft portion 52 is supported on the bearing assembly 48 for rotation relative to the end cap 55.

The end cap 55 and flange portion 57 engage and hold the internal mechanism 46 within the interior chamber 56. The end cap 55 and flange portion 57 prevent axial movement of the internal mechanism 46 in a direction along the axis 50 but allow the internal mechanism to rotate about the axis 50 via the bearing assemblies 48.

Figure 5:
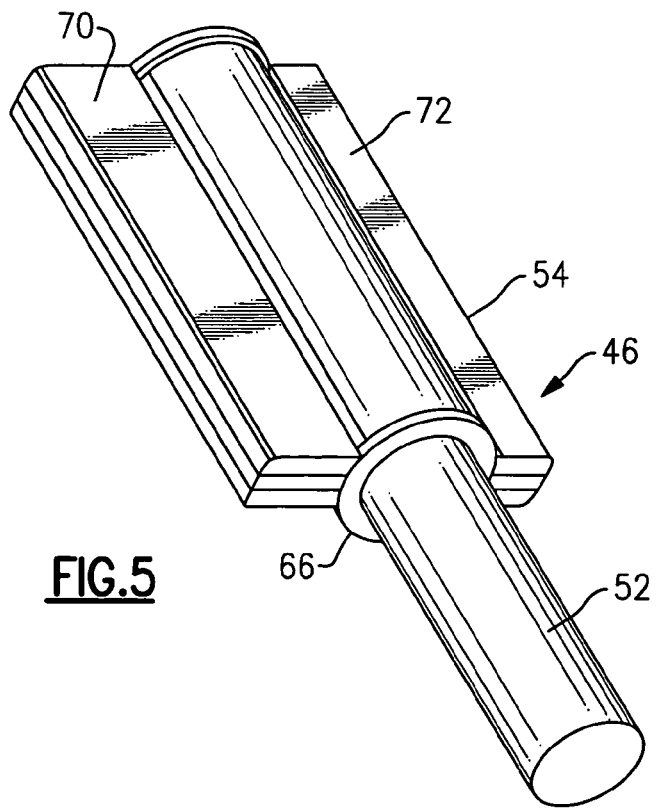
FIG. 5 is a perspective view of a paddle member of the roll control actuator.
Figure 6:
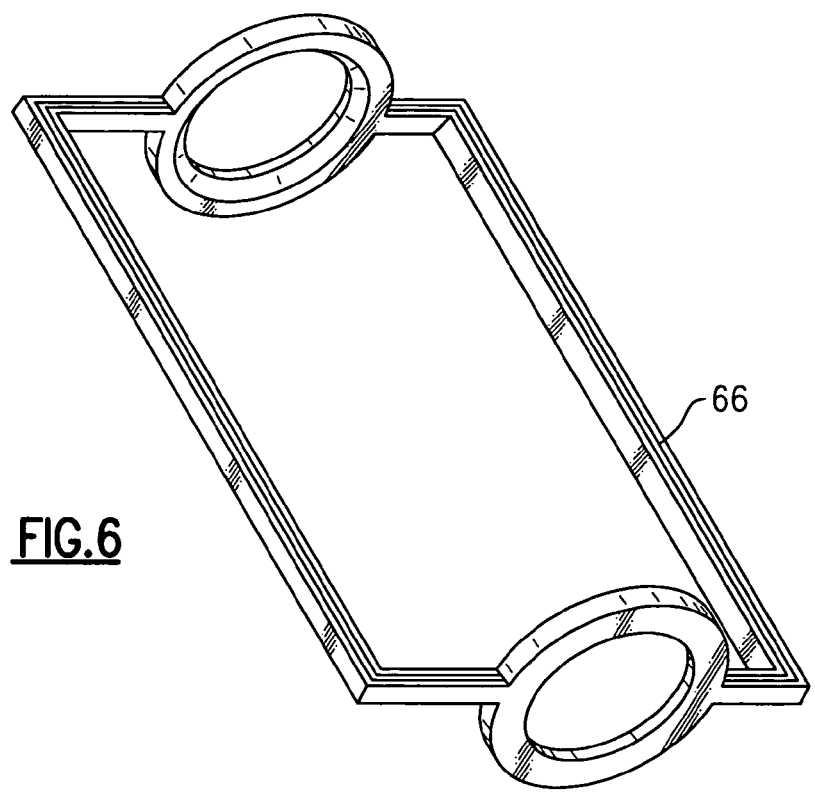
FIG. 6 is a perspective view of a seal assembly for the roll control actuator.

A seal 64 provides a sealing interface between the shaft portion 52 and the second end 44 of the outer housing 40. A seal 66 also seals the internal mechanism 46 at each end within the interior chamber 56. The seal 66 also provides sealing along the paddle portion 54 as shown in FIG. 5. An example profile for seal 66 is shown in FIG. 6.

The paddle portion 54 and outer housing 40 cooperate with each other to divide the interior chamber 56 into a plurality of fluid chambers, as shown in FIG. 4. The paddle portion 54 can include a plurality of paddle flanges and/or the outer housing 40 can include a plurality of housing flanges that form these fluid chambers.

In the configuration shown in FIG. 4, the paddle portion 54 includes a first paddle flange 70 and a second paddle flange 72 that each extend radially outwardly away from the axis 50. The first 70 and second 72 paddle flanges engage an inner surface 74 of the outer housing 40. The outer housing 40 includes first 76 and second 78 housing flanges that extend radially inwardly toward the axis 50 (see FIG. 7). The first 76 and second 78 housing flanges are alternated with the first 70 and second 72 paddle flanges to form first 80, second 82, third 84, and fourth 86 fluid chambers.

The first 80 and second 82 fluid chambers have different fluid volumes than the third 84 and fourth 86 fluid chambers. The first paddle flange 70 is longer than the second paddle flange 72, which provides the differing fluid volumes between the first 80 and second 82 fluid chambers and the third 84 and fourth 86 fluid chambers. Preferably, the first 80 and second 82 fluid chambers have generally equal volumes to each other and the third 84 and fourth 86 fluid chambers have generally equal volumes to each other. The first 80 and second 82 fluid chambers have volumes that are preferably greater than the volumes of the third 84 and fourth 86 fluid chambers.

Figure 7:
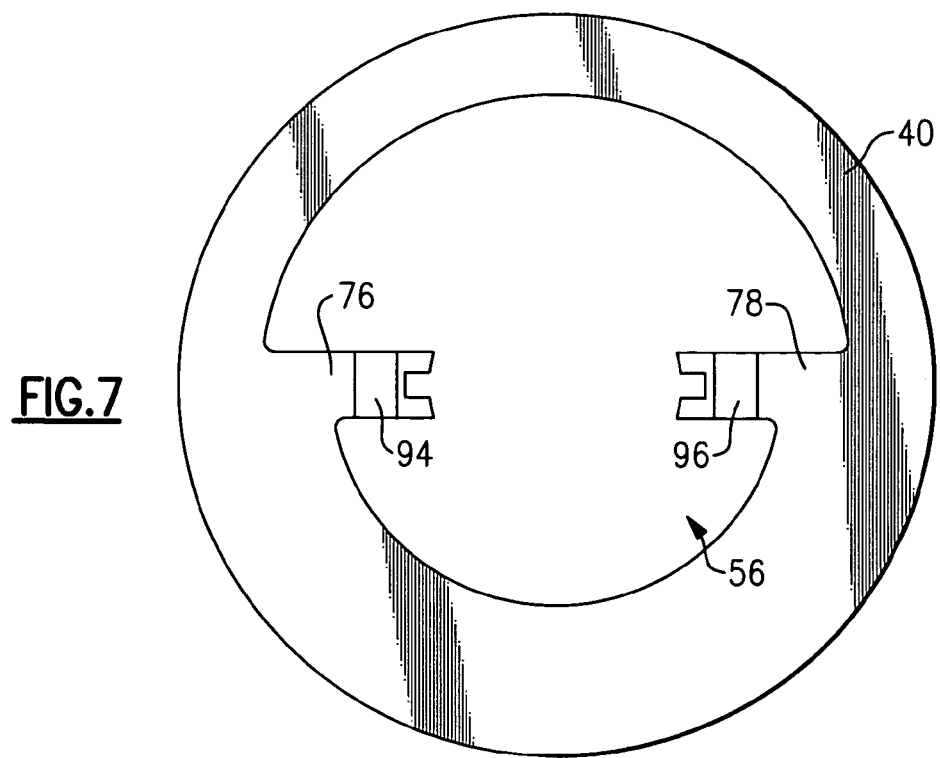
FIG. 7 is an end view of an outer housing for the roll control actuator.

First 90 and second 92 ports fluidly connect the first 80 and second 82 fluid chambers to the control valve 28 and accumulator 30. A third port 94 fluidly connects the first fluid chamber 80 to the third fluid chamber 84, and a fourth port 96 connects the second fluid chamber 82 to the fourth fluid chamber 86. The third port 94 is formed in the first housing flange 76 and the fourth port 96 is formed in the second housing flange 78 as shown in FIG. 7.

During straight line driving conditions, i.e. non-cornering maneuvers, fluid is allowed to flow through the first 90 and second 92 ports via the control valve 28 and accumulator 30. When the control valve 28 is open, fluid flows freely through the fluid volumes of the first 80, second 82, third 84, and fourth 86 fluid chambers via third 94 and fourth 96 ports, which are in fluid communication with the inlet port 32. This effectively reduces stiffness of the stabilizer bar 12 and improves ride comfort.

When a turning or cornering maneuver is identified, the control 26 increases roll stiffness by closing the control valve 28 to isolate the accumulator 30. Due to different fluid volumes between the first 80 and third 84 fluid chambers and between the second 82 and fourth 86 fluid chambers, the first 58 and second 60 bar portions are hydraulically locked together to increase bar rate or stiffness. When the accumulator 30 is isolated, fluid cannot flow through the third 94 and fourth 96 ports due to the difference in fluid volume. As an example, as shown in FIG. 4, if the paddle portion 54 was tending to rotate clockwise, the second fluid chamber 82 would be decreasing in volume and the fourth fluid chamber 86 would be increasing. Fluid would want to flow out of the second fluid chamber 82 and into the fourth fluid chamber 86. However, due to the different sizes of the chambers, the increase in the fourth fluid chamber 86 would be insufficient to receive the fluid driven by the decrease in the second fluid chamber 82. Thus, the paddle portion 54 would lock. Once the cornering maneuver is complete, the control valve 28 opens, and fluid is permitted to freely flow through the first 80, second 82, third 84, and fourth 86 fluid chambers via the third 94 and fourth 96 ports.

Optionally, the control 26 could include a pump 100, shown in dashed lines in FIG. 1, to provide a powered fluid connection to the first 80, second 82, third 84, and fourth 86 fluid chambers. The powered fluid connection could be utilized to enable the roll control actuator 22 to effectively increase the rate of the stabilizer bar.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A roll control actuator for a stabilizer bar in a vehicle suspension comprising:
    an outer housing adapted for attachment to a first stabilizer bar portion, said outer housing defining an internal cavity;
    an internal mechanism adapted for attachment to a second stabilizer bar portion, said internal mechanism extending into said internal cavity and defining a central axis;
    a plurality of fluid chambers formed between said outer housing and said internal mechanism, said plurality of fluid chambers comprising at least a first fluid chamber defining a first fluid volume and a second fluid chamber defining a second fluid volume that is different from said first fluid volume; and
    a control that selectively adjusts roll stiffness by controlling fluid flow through said plurality of fluid chambers, wherein said control allows free fluid flow through said plurality of fluid chambers for a first driving condition and prevents fluid flow through said plurality of fluid chambers for a second driving condition different from the first driving condition, wherein fluid flow is restricted during the second driving condition as a result of said first and said second fluid volumes being different from each other.

2. The roll control actuator according to claim 1 wherein said first and said second fluid chambers are circumferentially spaced apart from each other about said central axis.

3. The roll control actuator according to claim 1 wherein said outer housing includes an inlet port that provides fluid communication between said first fluid chamber and said control and wherein said control includes a fluid accumulator and a control valve, said control valve controlling fluid flow into said plurality of fluid chambers through said inlet port.

4. The roll control actuator according to claim 1 wherein said internal mechanism includes a shaft portion adapted for connection to the second stabilizer bar portion and a paddle portion including at least one radially extending paddle flange that engages an inner surface of said outer housing to form at least one of said plurality of fluid chambers.

5. The roll control actuator according to claim 4 wherein said plurality of fluid chambers includes a third fluid chamber defining a third fluid volume and a fourth fluid chamber defining a fourth fluid volume and wherein said outer housing includes at least first and second inwardly extending housing flanges, and said at least one radially extending paddle flange comprises first and second radially extending paddle flanges positioned in an alternating relationship to said first and said second inwardly extending housing flanges to define said first, second, said third, and said fourth fluid chambers.

6. The roll control actuator according to claim 5 wherein said first fluid volume and said third fluid volume are greater than said second fluid volume and said fourth fluid volume.

7. The roll control actuator according to claim 6 wherein said first and said third fluid volumes are approximately equal to each other and wherein said second and said fourth fluid volumes are approximately equal to each other.

8. The roll control actuator according to claim 5 including a first port fluidly connecting said first fluid chamber to said control, a second port that fluidly connects said third fluid chamber to said control, a third port that fluidly connects said first fluid chamber to said second fluid chamber, and a fourth port that fluidly connects said third fluid chamber to said fourth fluid chamber.

9. The roll control actuator according to claim 8 wherein said control includes a fluid accumulator and a control valve, said first and said second ports being in fluid communication with said control valve to control fluid flow into said first and said third fluid chambers.

10. A roll control actuator for a stabilizer bar in a vehicle suspension comprising:
    an outer housing adapted for attachment to a first stabilizer bar portion, said outer housing defining an internal cavity and including an inlet port;
    an internal mechanism adapted for attachment to a second stabilizer bar portion, said internal mechanism extending into said internal cavity and defining a central axis;
    a plurality of fluid chambers formed between said outer housing and said internal mechanism, said plurality of fluid chambers comprising at least a first fluid chamber defining a first fluid volume and a second fluid chamber defining a second fluid volume that is different from said first fluid volume; and
    a control that selectively adjusts roll stiffness by controlling fluid flow through said plurality of fluid chambers, wherein said inlet port provides fluid communication between said first fluid chamber and said control and wherein said control includes a fluid accumulator and a control valve, said control valve controlling fluid flow into said plurality of fluid chambers through said inlet port, and wherein the first and the second stabilizer bar portions are hydraulically locked together when said control valve is closed to increase roll stiffness and wherein the first and second stabilizer bar portions can rotate relative to each other about said central axis when said control valve is open to decrease roll stiffness.

11. A vehicle suspension comprising:
    a stabilizer bar having a first bar portion adapted for connection to a first wheel and a second bar portion adapted for connection to a second wheel laterally spaced from the first wheel;
    an actuator coupling said first bar portion to said second bar portion, said actuator including first and second fluid chambers each defining a first volume, and said actuator including third and fourth fluid chambers each defining a second volume that is different than said first volume; and
    a control including a control valve in fluid communication with an accumulator wherein said first and said second bar portions are hydraulically locked together by isolating said accumulator when said control valve is closed to increase roll stiffness by preventing fluid flow between said first, said second, said third, and said fourth fluid chambers, and wherein said first and said second bar portions can rotate relative to each other when said control valve is open to decrease roll stiffness by allowing fluid flow between said first, said second, said third, and said fourth fluid chambers.

12. The vehicle suspension according to claim 11 wherein said actuator comprises an outer housing fixed to said first bar portion and a paddle member fixed to said second bar portion, said paddle member being supported by a bearing assembly for rotation about a central axis.

13. The vehicle suspension according to claim 12 wherein said outer housing cooperates with said paddle member to prevent axial movement of said paddle member in a direction along said central axis.

14. The vehicle suspension according to claim 12 wherein said outer housing includes first and second inwardly extending housing flanges, and said paddle member includes first and said second radially extending paddle flanges positioned in an alternating relationship to said first and second inwardly extending housing flanges to define said first, said second, said third, and said fourth fluid chambers.

15. The vehicle suspension according to claim 14 including a seal assembly that is mounted to said first and said second radially extending paddle flanges.

16. The vehicle suspension according to claim 14 including a first port fluidly connecting said first fluid chamber to said control valve, a second port that fluidly connects said second fluid chamber to said control valve, a third port that fluidly connects said first fluid chamber to said third fluid chamber, and a fourth port that fluidly connects said second fluid chamber to said fourth fluid chamber.

17. The vehicle suspension according to claim 16 wherein said second volume is less than said first volume.

* * * * *

UNITED STATES PATENT AND TRADEMARK OFFICE
CERTIFICATE OF CORRECTION

PATENT NO. : 7,360,771 B2  
APPLICATION NO. : 11/242983  
DATED : April 22, 2008  
INVENTOR(S) : Smay et al.

It is certified that error appears in the above-identified patent and that said Letters Patent is hereby corrected as shown below:

Claim 2, Column 5, lines 35-36: "cireumferentially" should read as --circumferentially--

Claim 5, Column 5, line 57: insert --said-- before "second" and after "first,"

Signed and Sealed this

Fifteenth Day of July, 2008

JON W. DUDAS  
*Director of the United States Patent and Trademark Office*